United States Patent
Mathieu et al.

(10) Patent No.: US 12,135,260 B2
(45) Date of Patent: Nov. 5, 2024

(54) BENCH FOR MECHANICALLY CHARACTERISING THIN OBJECTS WITH INCREASED RELIABILITY

(71) Applicant: COMMISSARIAT A L'ENERGIE ATOMIQUE ET AUX ENERGIES ALTERNATIVES, Paris (FR)

(72) Inventors: Benoit Mathieu, Grenoble (FR); Olivier Gillia, Grenoble (FR); Come-Emmanuel Leys, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 223 days.

(21) Appl. No.: 17/787,289

(22) PCT Filed: Dec. 15, 2020

(86) PCT No.: PCT/FR2020/052453
§ 371 (c)(1),
(2) Date: Jun. 17, 2022

(87) PCT Pub. No.: WO2021/123609
PCT Pub. Date: Jun. 24, 2021

(65) Prior Publication Data
US 2023/0021162 A1 Jan. 19, 2023

(30) Foreign Application Priority Data
Dec. 20, 2019 (FR) ..................... 1915166

(51) Int. Cl.
*G01M 5/00* (2006.01)
*H01M 10/48* (2006.01)
(52) U.S. Cl.
CPC ........... *G01M 5/005* (2013.01); *H01M 10/48* (2013.01)

(58) Field of Classification Search
CPC .... G01M 5/005; G01M 99/007; H01M 10/48; H01M 4/133; H01M 4/134; H01M 4/386; H01M 4/587; H01M 10/0525; Y02E 60/10
See application file for complete search history.

(56) References Cited

U.S. PATENT DOCUMENTS

| | | | |
|---|---|---|---|
| 6,539,809 B1 * | 4/2003 | Weiss ...................... | G01N 3/08 73/825 |
| 10,184,778 B2 * | 1/2019 | Yoon ....................... | G01B 7/06 |

(Continued)

FOREIGN PATENT DOCUMENTS

| KR | 10-2008-0074240 A | 8/2008 |
|---|---|---|
| WO | WO 2016/085271 A1 | 6/2016 |

OTHER PUBLICATIONS

Wilkinson, D.P. et al., "Effects of physical constraints on Li cyclability," *Journal of Power Sources*, vol. 36, May 29, 1991, pp. 517-527, 11 pages.

(Continued)

*Primary Examiner* — Freddie Kirkland, III
(74) *Attorney, Agent, or Firm* — Oblon, McClelland, Maier & Neustadt, L.L.P.

(57) ABSTRACT

A bench for mechanically characterising a battery cell by applying a compressive force includes a frame carrying a bottom compression assembly and a top compression assembly, means for applying a compressive force to the cell between the compression assemblies, and a force sensor. Each compression assembly includes a compression part and a mounting surrounding the compression part. The compression part and the mounting are at least partly mechanically dissociated. The mounting of the top compression assembly carries movement sensors that measure the movement between the two mountings.

19 Claims, 5 Drawing Sheets

(56) References Cited

U.S. PATENT DOCUMENTS

| | | | |
|---|---|---|---|
| 10,845,181 B2* | 11/2020 | Kim | G01B 5/18 |
| 11,493,316 B2* | 11/2022 | Hong | H01M 4/04 |
| 2014/0017820 A1 | 6/2014 | Rentzsch et al. | |
| 2014/0178720 A1* | 6/2014 | Rentzsch | G01R 31/387 |
| | | | 324/426 |
| 2017/0074634 A1* | 3/2017 | Yoon | G01B 11/06 |
| 2023/0019225 A1* | 1/2023 | Mathieu | G01N 3/10 |
| 2023/0296676 A1* | 9/2023 | Brecht | G01B 5/30 |
| | | | 429/90 |

OTHER PUBLICATIONS

International Search Report mailed on Apr. 23, 2021 in PCT/FR2020/052453 filed on Dec. 15, 2020 (2 pages).

Preliminary French Search Report dated Sep. 3, 2020 in French Application 1915166 filed on Dec. 20, 2019 (2 pages with English Translation of Categories of Cited Documents).

\* cited by examiner

BENCH FOR MECHANICALLY CHARACTERISING THIN OBJECTS WITH INCREASED RELIABILITY

TECHNICAL FIELD AND PRIOR ART

The present invention relates to a bench for mechanically characterising thin objects, in particular a bench for characterising mechanical properties of battery cells and more particularly negative electrodes of electrical batteries, for example for characterising swelling/deflation thereof under electrical charging and discharging.

The negative electrodes of lithium-ion batteries based on graphite and silicon have a very great variation in thickness, of around at least 10% of the thickness, during charging (swelling) and discharging (deflation). The first cycle of «formation» of the cell sees a swelling of the same order of magnitude. For example, in the case of a silicon electrode, the thickness of the electrode increases by 20% during formation, and then deflates by 10% during the first discharge and gains approximately 10% in thickness at the following charge.

Negative electrodes containing silicon can be used in lithium-ion batteries. However, the swelling of silicon poses several types of problem, including:
- accelerated ageing due to a kind of mechanical fatigue of the electrode,
- a risk of premature failure, potentially by internal short-circuit that may result from crushing and rupture of the separator,
- problems of design of the package of the cell and of the battery pack. This is because a certain flexibility of the package has to be provided and the variations in volume have to be taken into account in the design of the package.

It is therefore desirable to be able to characterise precisely the swelling of the electrodes, and more generally of the cell and the dependency of this swelling with regard to the charge and to the forces applied, in order to be able to optimise the materials and the design of the cells and of the battery packages.

A characterisation bench is described in the document "*Effects of physical constraints on Li cyclability*", D. P. Willkinson et al, *Journal of Power Sources*, 36(1991) 517-527. It includes a frame, two uprights supporting a press, a pressure sensor, a movement sensor and a housing for the cell wherein the press applies to it a vertical force. The movement sensor is aligned with the direction of the vertical force. When the vertical force is applied to the cell, the frame deforms, which may interfere with the measurements of the movement sensor and therefore reduce the precision of measurement.

DESCRIPTION OF THE INVENTION

Consequently one aim of the present invention is to offer a bench for mechanically characterising thin objects that is reliable and precise, for example allowing a precise measurement of the variation in thickness of thin objects under a stress, for example of battery cells.

The aim stated above is achieved by a bench for mechanically characterising thin objects, including a frame, movable equipment, means for applying a force by means of the movable equipment, at least one force sensor, and at least one movement sensor for measuring the variation in thickness of the thin object. The frame and the movable equipment each include a compression face between which the object is compressed, and the frame and the movable equipment each include a measuring zone, one carrying the measuring sensor and the other being sensed by the measuring sensor, each measuring zone surrounding a compression face. At least the measuring zone of the movable equipment is connected to the compression zone of the movable equipment by a rigid connection in the direction of the movement to be measured and of low rigidity in the other directions, so that the deformation of the compression zones does not deform or deforms only a little the measuring zones and so that the risks of false measurements of the movement sensor are limited.

In an advantageous example, the low rigidity of the connection between the compression zone and the measuring zone in the direction orthogonal to the movement to be measured is obtained by staggered recesses formed in the measuring zone around the compression zone.

Preferably, the compression face or faces project with respect to the measuring zone, delimiting a zone for applying a given surface pressure. The compression face advantageously has a surface area less than or equal to the zone of the object that it is wished to characterise. By means of the use of the projecting compression face or faces, the uniformity of the pressure applied to the cell is twice as good, for the same precision of positioning of the cell in the test bench, as in the absence of the projecting compression part.

Advantageously, the compression force is transmitted from the means applying the force to the zone applying the force by at least one connection of the point contact type, which makes it possible to reduce the swivel forces, i.e. the rotation moments applied to the compression plate that result in a non-uniform pressure and in shear forces.

In one example embodiment, the means applying a vertical force include an electrical geared motor, pulleys, at least one cable and levers.

In another example embodiment, the means applying the vertical force include a hydraulic or pneumatic cylinder.

In another example embodiment, the means applying the vertical force include a mechanical screw jack.

The object of the present invention is then a bench for mechanically characterising a thin object by applying a compression force along a given compression axis, including:
- a frame,
- a bottom compression assembly resting on the frame and including a first compression face,
- movable equipment that is able to move along the compression axis with respect to the frame and carrying a top compression assembly including a second compression face opposite the first compression face,
- uprights secured to the frame,
- means for applying a force along the compression axis to the object intended to be located between the first and second compression faces, said force having a given intensity and being orthogonal to the first and second compression faces, the application means being secured to said uprights,
- at least one force sensor interposed between the movable equipment and the means for applying a force,
- at least one movement sensor disposed so as to measure the movement between the first compression face and the second compression face in the direction of the compression axis.

Furthermore the top compression assembly includes a second compression part carrying the second compression face and a second mounting surrounding the second compression part, the second compression part and the second mounting being rigidly connected to each other at least in the direction of the compression axis, and having a connection in the directions orthogonal to the movement direction, having low rigidity so that a deformation of the second compression part in the plane orthogonal to the compression direction does not deform or only slightly deforms the second mounting. The at least one movement sensor measures the movement between the top compression assembly and the bottom compression assembly.

Advantageously, the bottom compression assembly includes a first compression part carrying the first compression face and a first mounting surrounding the first compression part, the first compression part and the first mounting being rigidly connected to each other at least in the direction of the compression axis, and having a connection in the directions orthogonal to the movement direction that has low rigidity, so that a deformation of the first compression part in the plane orthogonal to the compression direction does not deform or only slightly deforms the first mounting.

In an advantageous example embodiment, the second compression part is connected to the second mounting by at least two second arms extending from the second compression part, a free end of each second arm being secured to an edge of the second mounting, and an aperture in the second mounting passing through the thickness of the second mounting substantially orthogonally to the arm is located opposite each free end of an arm.

The first compression part can also be connected to the first mounting by at least two first arms extending from the first compression part, a free end of each first arm being secured to an edge of the first mounting, and an aperture in the first mounting passing through the thickness of the first mounting substantially orthogonally to the arm can be located opposite each free end of an arm.

Advantageously, at least one of the first and second compression faces includes a projecting compression zone the surface area of which is less than or equal to a part of interest of the object to be characterised. The compression zone preferably has a surface area equal to the surface area of the part of interest of the object.

For example, the at least one movement sensor is carried by the first or second mounting and is in contact with the second or first mounting to measure the movement between the first mounting and the second mounting.

Advantageously, the bench includes three movement sensors distributed around the compression axis and means configured for comparing their measurements and detecting a flatness defect.

According to an additional feature, the second compression part includes a foot downstream of the second compression face in the direction of application of the compression force, said foot including two secant bores located in a plane orthogonal to the direction of application of the force.

Advantageously, the compression force is transmitted from the means for applying a force to the first and second compression faces by at least one connection of the point contact type.

The at least one force sensor is advantageously connected to the means for applying a force by a connection of the point contact type.

According to an additional feature, the means for applying a force (5) include means for modifying the intensity of the force applied.

In an advantageous example, the means for applying a force include a stepping geared motor, at least one first pulley in direct engagement with the output shaft of the geared motor, a second pulley, a cable between the first and second pulleys, at least one first lever carrying the second pulley and a second lever articulated on the first lever, and a compression rod is provided between the second lever and the second compression face.

For example, the at least one force sensor is disposed between the second lever and the compression rod.

According to an additional feature, the transmission of the force between the means for applying the force and the second compression face may take place through two connections of the point contact type.

Advantageously, the compression rod is in point contact with the second lever and the at least one force sensor.

Another object of the present invention is a method for characterising a thin object using a characterisation bench according to the invention, including:
- placing the object on the first compression face so as to align the part of interest with the compression zone,
- applying the second compression face to the object,
- measuring the movement between the two compression faces according to an applied compression force.

A stimulus may be applied so as to cause a modification of the volume of the object during the measurement.

According to an advantageous application, the thin object is an electrochemical battery cell the part of interest of which is the part including the stack formed by the positive electrode, the separator, the negative electrode and a package around the stack, the method including, during the measurements, a step of applying an electrical charging and/or discharging cycle.

BRIEF DESCRIPTION OF THE DRAWINGS

The present invention will be understood better on the basis of the following description and the accompanying drawings, on which.

DETAILED DESCRIPTION OF PARTICULAR EMBODIMENTS

The mechanical characterisation bench according to the invention will be described more particularly for measuring the swelling under stress of cells for a battery, more particularly negative electrodes. However, it will be understood that the bench for characterising under stress applies to any other thin object, and for characterising other properties of the object, for example the Young's modulus.

"Thin object" means an object extending mainly in one plane and the largest dimensions of which are in this plane. The object may include a single element or layer, or a stack of a plurality of elements or of a plurality of layers of identical, similar or different natures. One or more of these elements may react to a stimulus or several stimuli and modify the volume of the object in a direction transverse to the plane of the stack. The bench makes it possible to monitor this variation in volume.

Figure 9:
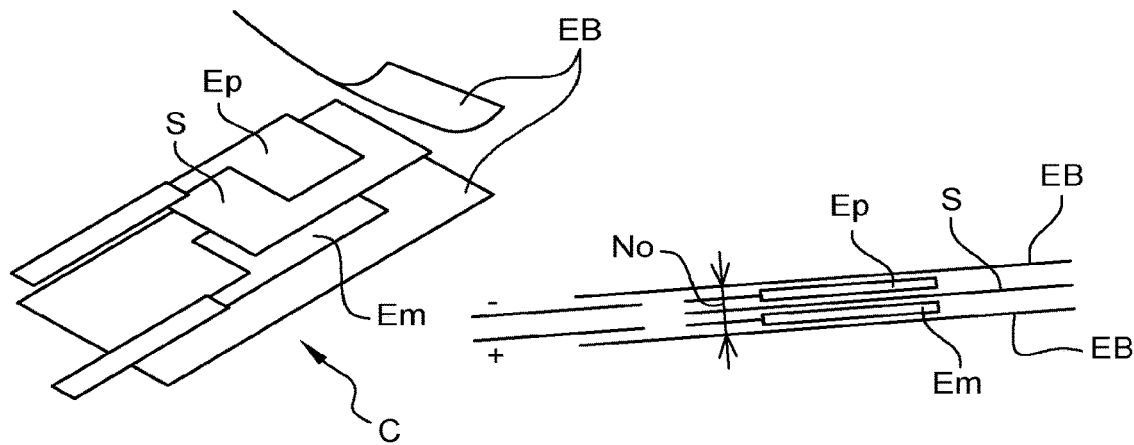
FIG. 9 is a schematic representation of a cell that it is wished to characterise with the bench.

On FIG. 9, a schematic representation can be seen of a cell that is a thin object adapted to a characterisation by the bench according to the invention. It includes a positive electrode Ep, a negative electrode En, a separator S and the package EB surrounding the electrodes separated by the separator.

"Nominal thickness" No will mean the thickness of the stack formed by the positive electrode, the negative electrode, the separator and the package.

The section of nominal thickness is the part of the cell having the nominal thickness. It has a surface area equal to that of the element of the cell having the smallest surface area, generally it is a case of the surface area of the positive electrode so as to guarantee the correct electrochemical functioning.

In the case of electrochemical cells, it is sought to characterise the section of nominal thickness reliably and precisely.

In the case of a battery cell, the stimulus is the electrical charging and/or discharging.

Figure 1:
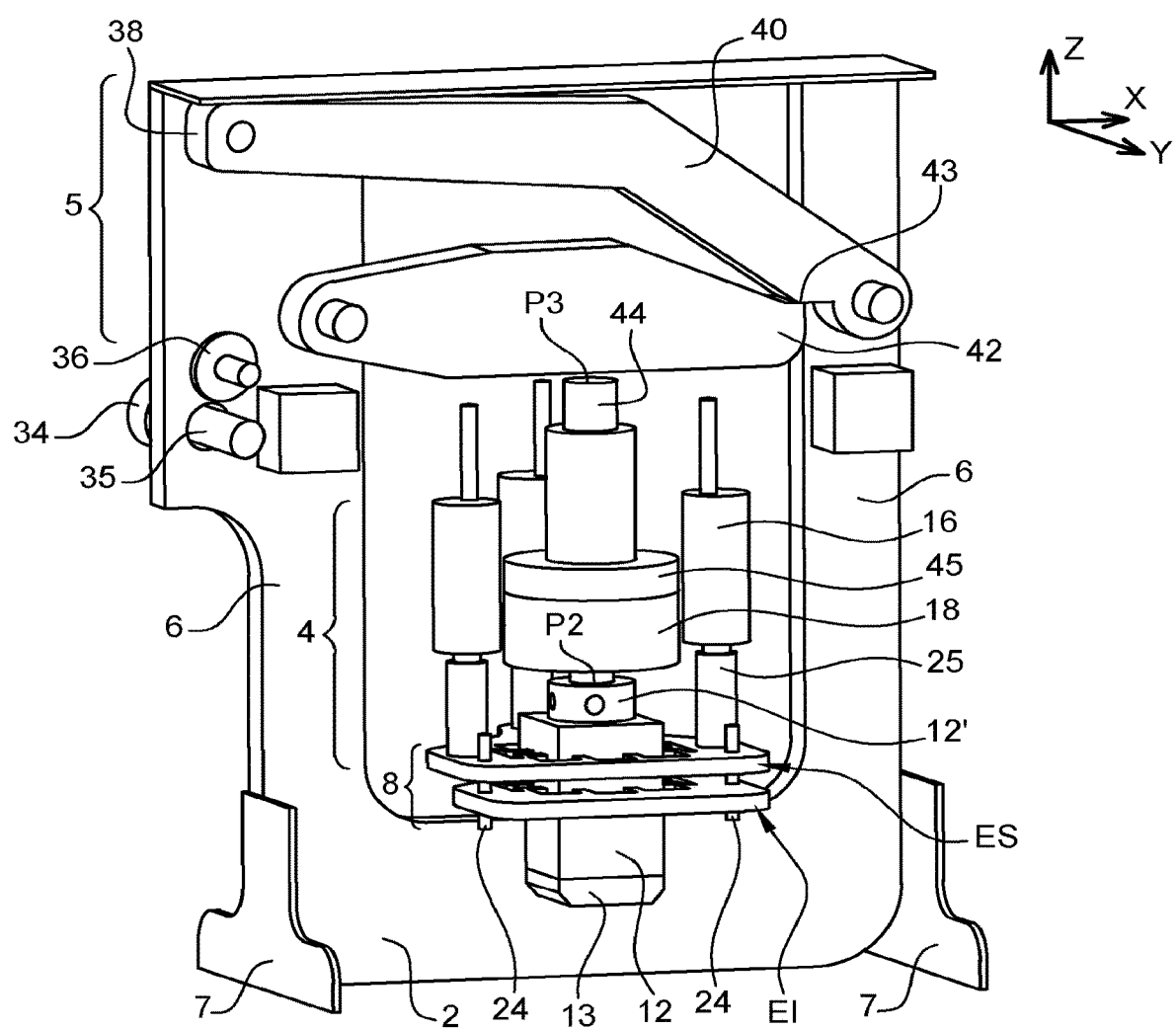
FIG. 1 is a perspective view of an example of a bench for mechanically characterising a thin object according to a first viewpoint.
Figure 2:
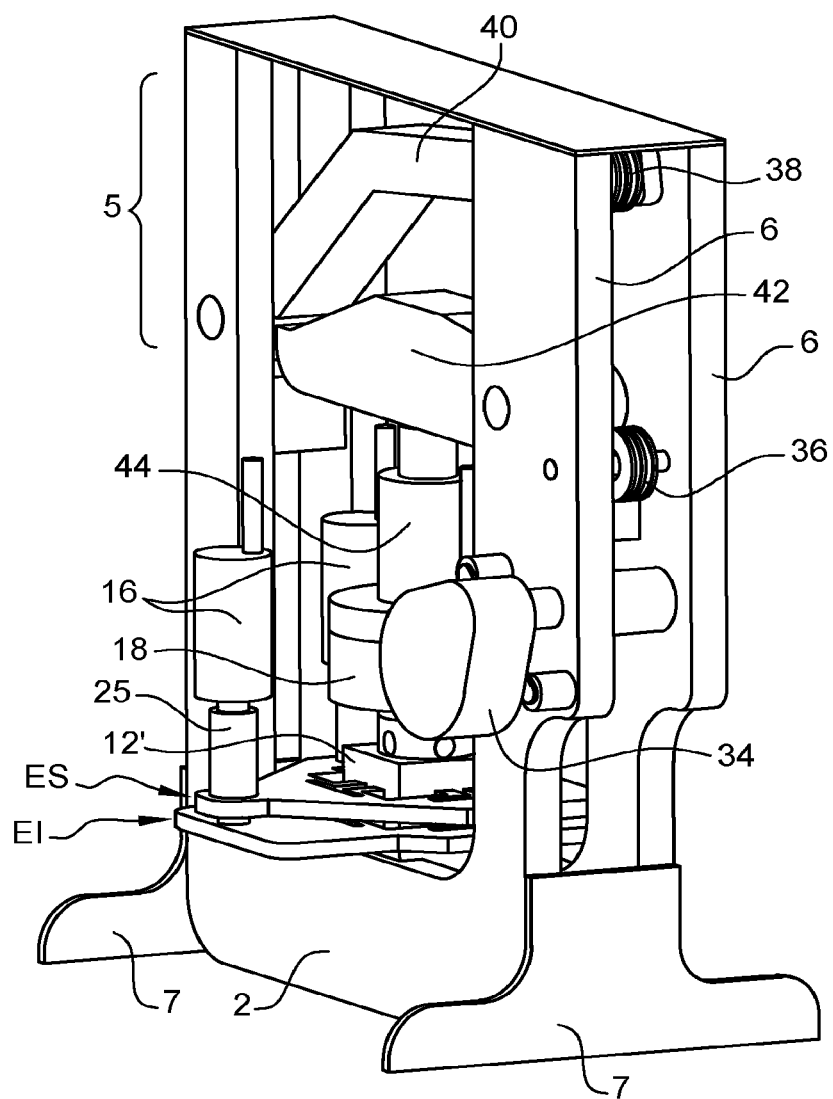
FIG. 2 is a perspective view of the bench of FIG. 1 according to a second viewpoint.

On FIGS. 1 and 2, a schematic representation can be seen of an example embodiment of a characterisation bench according to the invention.

The characterisation bench includes a frame 2 forming a base for the bench, movable equipment 4 mounted so as to be able to move in translation in the vertical direction Z, and means 5 for applying a force in the vertical direction Z. The directions X and Y are directions orthogonal to the axis Z. The movable equipment also includes a force sensor 18 for measuring the force applied by the means 5.

The means 5 for applying a force in the vertical direction Z are mounted on two uprights secured to the frame 2. The uprights 6 make it possible to ensure an acceptable orientation of the force applied in the required direction, i.e. the direction Z, and make it possible to reduce any parasitic forces and moments on the movable equipment and therefore on the cell to be tested. In the example shown, the frame and the uprights are produced by assembling two flanges cut from a thick plate piece. Feet 7 are provided for holding the frame 2 and the uprights 6 in a vertical position.

The bench includes a stress-application zone 8 configured for receiving the thin object, for example a battery cell C, and applying a compression thereto. For purposes of simplicity, the thin object will be referred to as a "cell".

The stress-application zone includes a bottom compression assembly EI and a top compression assembly ES.

The bottom compression assembly EI rests on the chassis and is fixed along the vertical direction and in the plane XY.

The bottom compression assembly EI includes a compression face FC that is located at the centre of the assembly and a measuring zone ZM surrounding the compression face FC. The movement sensor or sensors described below are in contact with the measuring zone.

The top compression assembly ES is carried by the movable equipment so as to be vertically in line with the bottom compression assembly EI and so as to be able to approach the bottom compression assembly EI.

The top compression assembly ES includes a compression face FC that is located at the centre of the assembly and a measuring zone ZM surrounding the compression face FC. In this example, the movement sensor or sensors described below are carried by the second measuring zone.

The bottom compression assembly EI and the top compression assembly ES will now be described in detail.

Figure 3:
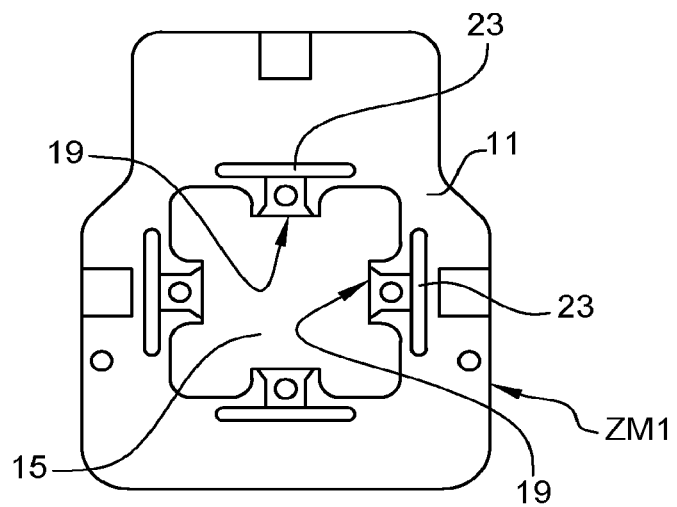
FIG. 3 is a plan view of an example of a measuring zone of a bottom compression assembly of the bench of FIG. 1.
Figure 4:
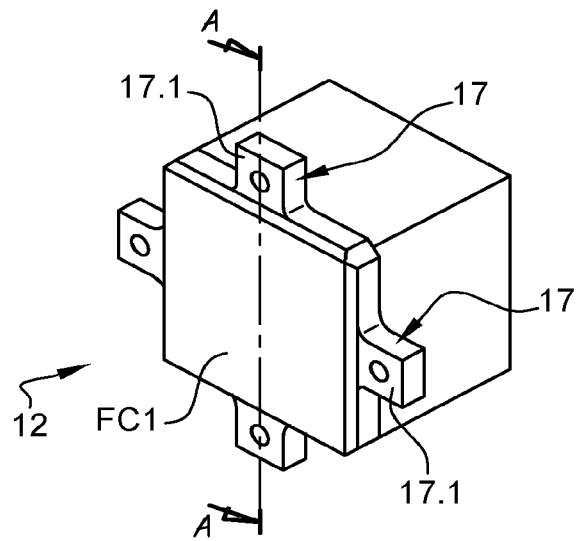
FIG. 4 is a perspective view of an example of a compression part of a bottom compression assembly of the bench of FIG. 1.
Figure 5:
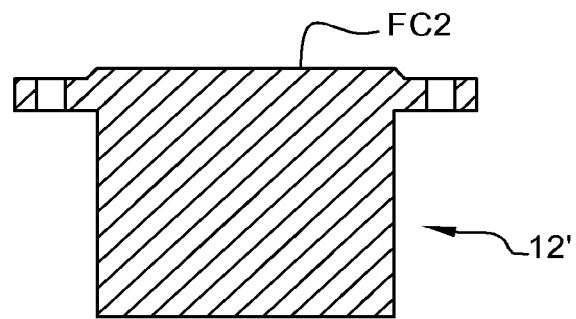
FIG. 5 is a view in cross section along the longitudinal plane A-A of the compression part of FIG. 4.

On FIGS. 3 to 5, the various elements of the bottom compression assembly EI can be seen shown. It includes a first central part, referred to as the first compression part, which carries the first compression face FC1 and has great thickness. The first compression part 12 forms an anvil. Preferably, the first compression part is made from hard material, for example a material having a Young's modulus greater than 160 GPa, for example a steel avoiding crushing by the pressure.

The first measuring zone ZM1 is formed by a first frame 11 surrounding the first compression part 12.

In the example shown on FIGS. 4 and 5 and preferably, the first compression face FC1 projects from the top face of the measuring zone ZM1. The surface area of the compression face FC1 is less than or equal to the surface area of the section of nominal thickness of the cell. Thus, during measurement, the section under compression includes the two electrodes over the whole of its surface. Preferably, the height of the projection is selected so as not to compress power-supply lugs or any other element emerging laterally from the electrodes.

By using a compression face having a surface area of no more than the surface area of the section of nominal thickness to within +/−2 mm, i.e. and by centring this face on the section of nominal thickness that is of constant thickness, the pressure applied to the cell is homogeneous and the measurements made are reliable. This is because it can be demonstrated by calculation that a misalignment between the centre of gravity of the pressure application surface and the section of the object having the nominal thickness causes the application of a non-homogeneous pressure within the cell.

In the example shown, a strut 13 is placed between the mounting 2 and the first compression part 12, making it possible to modify the position of the compression face FC1 along the axis Z. Advantageously, the contact between the mounting 2 and the strut 13 is an abutment at a singular point or almost so, limiting the transmission of the deformation of the mounting to the compression part.

The first mounting 11 includes a window 15 housing the compression part 12. The first mounting 11 preferably has a smaller thickness than the compression part.

The bottom compression assembly includes, between the first measuring zone ZM1 and the first compression part 12, connection means providing great rigidity in the movement direction Z and a certain flexibility in the plane XY in order to absorb the expansion of the compression part 12 in the plane XY and to limit the risks of deformation of the measuring zone.

In this example, the first compression part 12 has a roughly square shape and the window of the first mounting 11 also has a roughly square shape homothetic with the shape of the first compression part 12.

The connection means ensure that the first compression part 12 and the first mounting 11 have the same position along the direction Z. Advantageously, the connection between the mounting 11 and the compression part 12 is located at a height Z as close as possible to that of the surface in contact with the cell. In this example, the first compression part 12 includes four arms 17 each extending from an external edge of the first compression part 12 in the direction of an interior edge of the first mounting 11. In a variant, two or three arms can be provided between the compression part and the mounting. In a variant, the parts 11 and 12 may be machined in a single piece and form a single part.

The interior edges of the first mounting 11 each carry a housing 19 receiving the free end 17.1 of an arm 17. The free end 17.1 of each arm 17 and each housing 19 include a through hole. In the example embodiment illustrated, the mounting is secured to the arms by means of screws, the arms being pierced with threaded holes, providing the rigid connection between the compression part 12 and the first mounting 11.

Moreover, the exterior part of the compression zone 12 is connected to the mounting 11 by a flexible zone capable of absorbing an expansion along X and along Y of the compression zone without transmitting it to the measuring zone. In this example, the flexible connection between the compression part 12 and the mounting is obtained by means of an aperture 23 formed in the first mounting 11. The aperture 23 is through and extends orthogonally to the arm 17. Each aperture 23 is located between a housing 19 and the external edge of the first mounting 11. The apertures 23 are elongate in form and advantageously have a length greater than the width of a housing 19.

Figure 10:
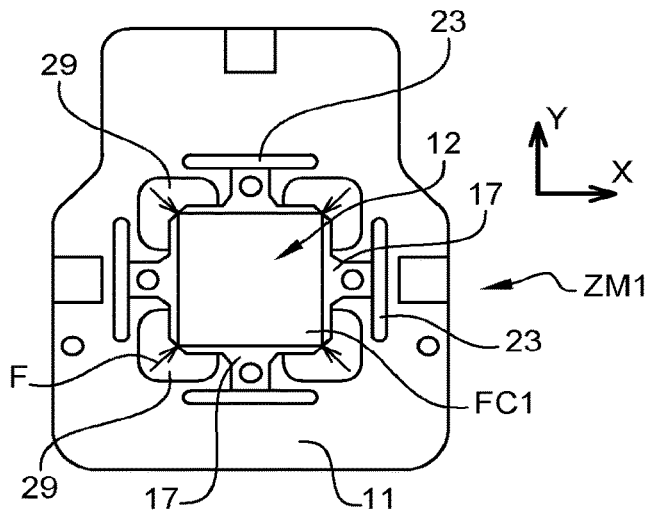
FIG. 10 is a view of the bottom compression assembly the elements of which are shown on FIGS. 3 and 4.

On FIG. 10, a plan view can be seen of the compression part 12 mounted in the first mounting 11.

The flexibility in the plane XY between the compression part 12 and the mounting 11 makes it possible to guarantee the precision of measurement of the movements. When the compression part 12 is subject to a compressive stress along Z and because of the Poisson's ratio of the material of the compression part 12, the latter expands in the directions X and Y. For example, under the stress along Z of 10 MPa, the expansion along X of the compression part reaches 600 nm. The deformable zones on the mounting 11 absorb the expansion of the compression part, and avoids the mounting deforming in "chips" in a way that is difficult to control. Such a deformation would cause a very significant error in measurement, for example of several micrometres, on the measurement of the relative movements along Z of the compression parts.

As can be seen on FIG. 10, in the zones outside the connection zones between the compression part and the mounting, a space 29 is formed between the external edge of the compression part 12 and the mounting 11 absorbing the expansion of the compression part 12 in these zones and avoiding contact with the mounting. In this example, four spaces 29 are formed, a space being located between each top of the compression part and a top of the mounting. The spaces are formed in L-shaped windows.

Figure 11:
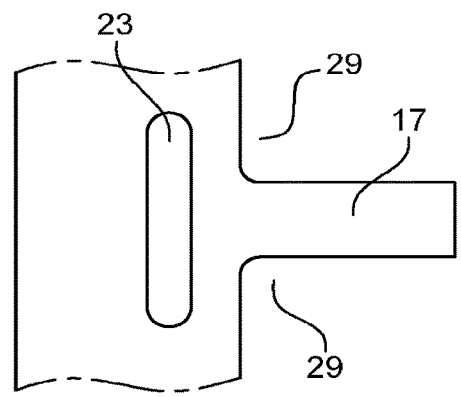
FIG. 11 is a schematic detail view of FIG. 10.

On FIG. 11, a detail of a flexible connection at a window 23 can be seen. The window 23 and the spaces 29 define staggered through recesses formed in the measuring zone around the compression zone. The spaces 29 define two symmetrical recesses on either side of the arm 17.

In this example the spaces are empty. In a variant it can be filled in in whole or in part by a sufficiently flexible material, such as an elastomer, not transmitting the expansion of the compression part to the mounting.

Figure 6:
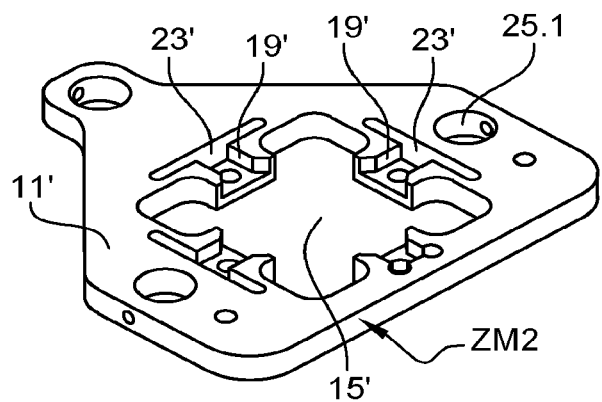
FIG. 6 is a perspective view of an example of a measuring zone of a top compression assembly of the bench of FIG. 1.
Figure 7:
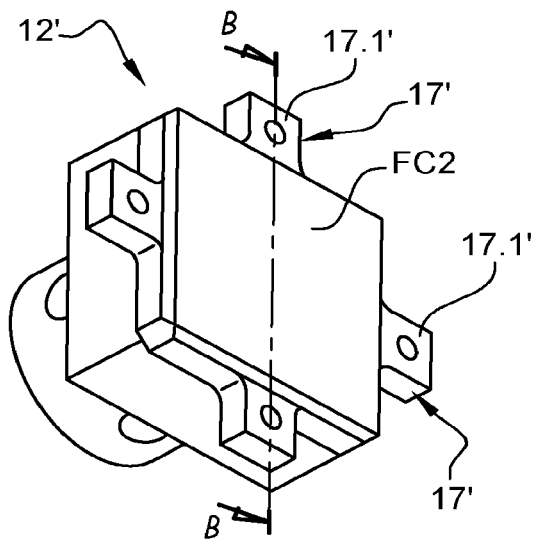
FIG. 7 is a perspective view of an example of a compression part of a top compression assembly of the bench of FIG. 1.
Figure 8:
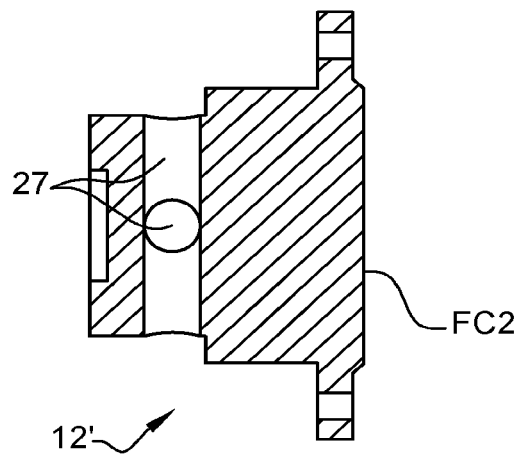
FIG. 8 is a view in cross section along the plane B-B of the compression part of FIG. 7.

On FIGS. 6 to 8, the various elements of the top compression assembly ES can be seen shown. The top compression assembly ES has a form and structure similar to those of the bottom pressure assembly EI.

It includes a second central part 12', referred to as the second compression part, carrying the second compression face FC2 and having great thickness. The second compression part 12' forms an anvil. The second compression part 12' is preferably also made from hard material, for example from a material having a Young's modulus greater than 160 GPa, for example a steel avoiding crushing by the pressure.

The top compression assembly ES also includes a second mounting 11' surrounding the second compression part 12' and forming the second measuring zone. The second mounting 11' includes a window 15' housing the second compression part 12'. The second mounting 11' preferably has a smaller thickness than the second compression part 12'.

The top compression assembly also includes connection means providing great rigidity in the direction of movement Z and a certain flexibility in the plane XY in order to absorb the expansion of the compression part in the plane XY and to limit the risks of deformation of the measuring zone.

In this example, the second compression part 12' has the same form as the first compression part 12 of the bottom compression assembly EI. It therefore has a roughly square shape, and the window 15' of the second mounting 11' also has a roughly square shape homothetic with the shape of the second compression part 12'.

The second compression part 12' and the second mounting 11' are rigidly connected to each other at least along the direction Z so as to have the same position along the direction Z, and in the plane XY. In this example, the first compression part 12' includes four arms 17' each extending from an external edge of the second compression part 12' in the direction of an internal edge of the second mounting 11'. In a variant, two or three arms can be provided between the compression part and the mounting.

The internal edges of the second frame 11' each carry a housing 19' receiving the free end 17.1' of an arm. The free end 17.1' of each arm 17' and each housing 19' include a threaded hole. The arms are secured to the housings, providing the rigid connection between the compression part 12' and the first mounting 11' in the direction Z.

In this example, the flexibility in the plane XY between the second compression part 12' and the second mounting 11 is also obtained by means of through apertures 23' extending orthogonally to the arms and located between the housings 19' and the holes 25.1 in the second mounting 11' receiving the housings 25 of the movement sensors. The apertures 23' are elongate in shape and advantageously have a length greater than the width of a housing 19'. In a variant, the parts 11' and 12' can be machined in a single piece and form a single part.

As with the top compression assembly, in the zones outside the connection zones between the compression part and the mounting, a space is provided between the external edge of the compression part 12' and the mounting 11' absorbing the expansion of the compression part 12 in these zones and avoiding contact with the mounting.

In this example the space is empty. In a variant it can be filled in in whole or in part with a sufficiently flexible material, such as an elastomer, not transmitting the expansion from the compression part to the frame.

Provision can be made for the space to be empty in the case of one of the compression assemblies and filled in in the case of the other compression assembly.

As with the bottom compression assembly, each window 23' and the spaces between the second compression part 12' and the mounting form staggered through recesses.

The second frame 11' also includes housings 25, three in the example shown, receiving the movement sensors. The housings 25 are formed by tubes mounted in through holes 25.1 extending in the direction Z and the movement sensors 16 are mounted in the tube so that they are in contact with the first mounting 11 and can measure the relative movement of the first 11 and second 11' mountings which corresponding to the relative movement of the first 12 and second 12 compression parts. For example, when battery cells are characterised, movement sensors having reproducibility specifications for the measurements to the maximum of 150 nm and a travel of 2 mm are preferably selected.

Preferably, the movement sensor or sensors 16 is or are one or more passive electrical sensors for linear movements or LVDTs (Linear Variable Differential Transformers). In a variant, it may be a case of a capacitive sensor or sensors. Several movement sensors are advantageously used, which makes it possible to detect flatness defects during compression, i.e. for example the movable equipment being put aslant.

It will be understood that the arrangement of the arms 17, 17' and their attachment 11, 11' respectively are not limitative and that other configurations providing a rigid connection at least in the direction Z can be envisaged.

The connection means between the mounting 11, 11' and the compression part 12, 12' described above provide reproducible stable measurements.

In a variant, the means providing both great rigidity along Z and flexibility in the plane XY can be implemented by three or four point contacts associated with a spring pressing the mounting 11, 11' on the compression part 12, 12' respectively. Nevertheless, the manipulation of the compression assemblies may be more complex.

In the example shown, the second bottom compression part 12' includes a compression face FC2 projecting from the top face of the second mounting, in particular from the measuring zone ZM2 (FIGS. 7 and 8).

In this example, the surface area of the second compression face FC2 is equal to that of the first compression face FC1. Preferably, the height of the projection is selected so as not to compress power-supply lugs or any other element emerging laterally from the electrodes.

In a variant one or other of the compression faces FC1 and FC2 project with respect to their respective mounting and one or other of the compression faces has a surface area less than or equal to the or equal to the surface area of the section of nominal thickness of the cell.

The second compression part includes a foot advantageously provided with two secant bores 27 and extending in the plane XY, which allow a distribution of the force exerted by the application means 5 on the compression face FC2 and to obtain an even more uniform pressure and deformation on the compression face FC2.

In the example shown, the movement sensors form part of the top compression assembly ES and move with the second mounting. In a variant the movement sensors can be secured to the first mounting and sense the position of the second mounting.

Furthermore it will be understood that one or two movement sensors can be used.

In the example shown, the part of the second mounting not receiving the movement sensor is narrow in the plane XY, which gives this part the necessary flexibility for absorbing the expansion of the part 12.

In the example shown and advantageously, the first and second mountings include means for alignment with each other in the direction Z. The alignment means include centring rods 24 that cooperate with through holes 26 formed in the first mounting and in the second mounting. The fitting of the rods in the holes 26 provides good alignment of the top and bottom compression assemblies.

The first and second compression faces have a certain flatness to ensure the homogeneous application of the stresses in the cell, for example the faces of the anvils are precision-ground, advantageously having a difference in flatness of less than 1 µm.

Advantageously, a honing of the compression faces can be carried out, once the mountings have been secured to the compression parts, in order to guarantee a perfect match of the facing compression faces with no clearance.

It is possible to reduce the number of parts, in particular by combining the functions of the compression plates with the adjacent parts. Nevertheless, the use of separate parts offers the advantages of being able to replace them in the event of a fault and to change the geometry according to the objects to be tested.

In this example, the means for applying the force 5 are carried by the uprights 6. They include an electric geared motor 34, a winding drum 35 in direct engagement with the output shaft of the geared motor 34, a set of pulleys 38 carried by a first end of a first lever 40 that is articulated by a second end on one of the uprights 6 about a horizontal axis, a cable (not shown) wound on the two sets of pulleys 36, 38 forming a multiple pulley block that amplifies the traction on the cable by a factor of 6, and a second lever 42 articulated rotationally on the other upright 6 about a horizontal axis and connected to the first lever 40 by a cam 43.

Preferably, the means for applying the force 5 are capable of applying a force of 10 kN on 10 cm$^2$, i.e. 10 MPa.

The force sensor 18 is disposed between the second compression part 12' and a compression lug 44 that is in abutment against the lever 42 and transmits the force to the second compression part. In the example shown, a support 45 of the force sensor is used, it includes a base against which the sensor 18 is in abutment and a threaded tube the passage of which emerges in the base and makes it possible to receive the threaded compression rod 44. The assembly consisting of compression rod 44 and support 45 is advantageously adjustable for length. In the retracted position, it can be fitted in the housings provided in the part 12'. Once fitted, the rod is unscrewed in order to grip the whole of the movable equipment.

In the example shown and highly advantageously, the force is transmitted from the means 5 to the force application zone by two contacts at a singular or quasi-singular point. In this example, the compression rod 44 is in point contact by its top end with the lever 42. For example, the top end of the compression rod 44 has a conical shape that is received for example in a hole, for example 1 mm in radius, holding the top end of the rod in position in the plane XY. Advantageously, the hole is pierced in the flat bottom with a circular housing with a diameter greater than the compression rod, making it possible to lock the latter in the event of sliding of the rod in the plane XY. In another example embodiment, the head of the screw 44 is spherical and is housed in a spherical bearing machined in the lever 42. The lever can advantageously be produced from a low-friction material, such as a polymer or self-lubricated bronze for example).

The force sensor includes for example a spherical support head that is for example placed in abutment on the flat bottom of a circular housing machined in the top part of the second compression part 12' in order to implement an abutment at a singular point. In another example embodiment, the compression rod or the threaded tube is provided with calibrated strain gauges forming a force sensor and the two ends of the assembly carry either conical heads, or spherical heads in abutment on a plane or on a spherical housing.

The use of two connections at a singular or quasi-singular point makes it possible to reduce or even eliminate the swivel forces.

Activation of the geared motor 34 makes the first lever rise or fall which, via the cam, makes the second lever rise or fall with a smaller amplitude, between 10 and 20 times for example, modifying the force applied.

In the example presented, the means for applying the force 5 can make it possible to amplify the force by a factor of 100 between the traction force on the cable and the force applied to the anvils. The flexibility of the system overall, in particular the elasticity of the cable, of the levers 40 and 42, of the rods 44 and 45 and of the uprights 6, enables a motor provided with a gearbox allowing 6000 steps/turn to regulate the force applied to within less than 1 N when the bench is empty or the rigidity of the object being tested is infinite.

The geared motor can be controlled in real time as a function of the time and parameters measured, such as the state of charge of the cell, and the variations in thickness measured by the movement sensors. It is thus possible, for example, to keep the compression force constant under all circumstances, whatever the variation in thickness of the sample, or to vary the compression force with a law dependent on the thickness of the cell, or to vary the force with the time to measure the "deformation as a function of the pressure" characteristic of the sample.

The means 5 have the advantage of storing low energy relative to the spring, and the risks of ejection of the movable equipment are therefore reduced. The centring rods 24 can be selected to be thin since they now have nothing but a centring role.

Advantageously, the assembly consisting of compression rod 44 and support 45 has a variable length, and for this purpose it can include two parts connected to each other by screwing, which enables it to be removed easily and leaves clear a great height between the means 5 and the movable equipment, making it possible to be able to access the bottom compression assembly EI and the movement sensors.

In a variant, the force sensor is disposed between the lever 42 and the compression rod. The connection of the point contact type is then made between the sensor and the lever and between the sensor and the compression rod. The system makes it possible to provide an abutment almost at a singular point of the compression rod on the lever in order to cancel out the swivel forces.

Springs are preferably provided for holding the levers in the high position, making it possible to easily remove the compression rod and therefore the bottom compression plate without the levers falling.

The force sensor 18 is aligned with the axis Z along which the force is applied. The force sensor 18 measures the force applied to the cell. It should be noted that the weight of the movable equipment (support plate, top compression plate, movement sensor or sensors and optionally homogenisation plate that will be described below) is to be added to the force measured by the sensor 18 for calculating the force applied to the sample.

By way of example, the force sensor 18 may be a sensor using an elastically deformable part and including deformation gauges, preferably sensors with four gauges organised in a "full bridge" and calibrated for temperature in order to guarantee a precise measurement without drift over time, which therefore does not require periodic calibration. By way of example only it is possible to use a D-Mesure® force sensor, model K450H-10 kN.

The second compression part 12' has great thickness and width, for example 30 mm by 30 mm, which ensures the flatness of the compression surface by homogenising the stresses.

Advantageously, a homogenisation plate can be interposed between the top compression assembly ES and the force sensor. It is preferably produced from hard material, preferably having a Young's modulus greater than 160 GPa, for example steel, and has a thickness of at least 20 mm. The use of such a homogenisation plate makes it possible to reduce the thickness of the second compression part while keeping good homogeneity of the deformation and of the pressure. The homogenisation plate highly advantageously includes, on its face in contact with the second compression part, a ring projecting from the surface forming an annular abutment against the second compression part.

The bench is such that the points P1, P2 and P3 shown in FIG. 1 are aligned on the axis Z, along which the compression force is applied.

P1 (not visible) is the centre of gravity of the compression face FC2 of the top compression assembly ES, P2 is the connection point of the point contact type between the force sensor 18 and the rear face of the second compression part 12', and P3 is the top longitudinal end of the compression rod opposite to that of the side of the force sensor 18. The axis Z along which it is wished to apply the compression force to the cell passes through the points P1 and P2.

Moreover, as will be described below, the fitting of the cell between the compression parts 12, 12' is such that it ensures that the section of nominal thickness is centred on the point P1.

Advantageously, by selecting one or more compression faces FC1, FC2 having the surface area of the section of nominal thickness, the centring of the cell is simplified and the whole of the section of nominal thickness is characterised.

In the case of a characterisation of an object of non-homogeneous thickness, such as for example a battery cell that includes a negative electrode and a positive electrode, the positive electrode having a smaller surface area than that of the negative electrode, the zone applying the pressure is no more than the section of the object to be characterised having a substantially constant thickness, i.e. in the case of a cell it is a case of the section with a surface area equal to that of the positive electrode.

The characterisation bench is particularly adapted to measuring the swelling/deflation of the cells under charging. The bench advantageously includes means for electrically connecting the cell to a generator/to a charge according to the measurement made.

Provision may also advantageously be made to dispose the bench in a thermally stable environment to achieve good reproducibility of the measurements. The characterisation bench may be disposed in a temperature-regulated enclosure, wherein the bench would be protected from air flows and sources of thermal radiation. It is then possible to achieve a reproducibility of the movement measurements better than +/−50 nm with the bench according to the invention.

According to another example, the means for applying a force include a helical spring maintained under compression, the spring being coaxial with the axis Z. Preferably, the means for applying the force make it possible to modify the intensity of the force applied. In the example shown, the spring 7 is in abutment through its longitudinal ends between two cross members perpendicular to the direction Z and secured to the uprights and the relative distance of which in the vertical direction is adjustable, making it possible to modify the compression of the spring and therefore the force applied to the cell.

The cross members may each include a seat respectively housing the top longitudinal end and the bottom longitudinal end of the spring and fixing the alignment of its axis with the axis Z along which the force is to be applied.

Advantageously, means can be provided for adjusting the alignment of the axis of the spring with the axis Z. For example, the seat 1 of the top cross member may have several positions in a direction perpendicular to the axis Z for adjusting the alignment of the spring to the axis Z.

According to another example embodiment, the means for applying the vertical force include a hydraulic or pneumatic cylinder.

According to another example embodiment, the means for applying the vertical force include a screw-type mechanical jack.

In the example shown, both the top compression assembly and the bottom compression assembly include connection means providing flexibility in the plane XY between the compression part and the mounting.

In another example, only the top compression assembly includes such means and a bottom compression assembly including a solid anvil does not exhibit or only slightly exhibits expansion with regard to the stresses considered.

The use of the top compression assembly ES as described in relation to FIGS. 6 to 8 has the advantage of offering very light movable equipment.

An example of operation of the characterisation bench of FIGS. 1 to 2 for characterising a cell will now be described.

The cell is positioned for example on the first compression part 12 of the bottom compression assembly EI, so as to align the section of nominal thickness with the first compression face FC1.

For example, the corners of the electrode with the smallest surface area are located, for example, by marking with a felt pen the corners of the negative electrode of the cell by arrows F pointing towards each corner, starting from the outside.

As can be seen on FIG. 10, the bottom compression assembly EI includes four windows 29 in an L shape, the two arms of each L forming an interior angle oriented towards the compression part 12.

The bottom compression assembly is disposed above the cell, the compression zone opposite the face of the cell carrying the arrows, and is positioned so as to align the end of each arrow F with an interior angle of an L-shaped window 29. An adhesive is advantageously used on the compression part 12 to secure the cell to it.

If the spaces between the compression part and the mounting are partly filled in with a flexible material, zones without flexible material are provided for being able to view the arrows, when the above alignment method is implemented.

In a variant, the cell may be positioned precisely and secured to the compression part of the top compression assembly and next be positioned on the movable equipment opposite the top compression assembly.

The placing and the securing in position of the cell on the compression assembly with adhesive is facilitated if the plate to which the cell is secured is the one that does not carry the sensors.

The movable equipment is locked in a high position to enable the fitting of the bottom compression assembly EI.

The bottom compression assembly EI is next positioned on the frame.

The relative positions of the bottom compression assembly EI and of the top compression assembly ES are next adjusted by means of the rods 24. The point P2 and the point P1 are aligned.

The movable equipment is released from its high position and the second compression part 12' of the top compression assembly ES compresses the cell.

The rods 24 are removed after a minimum force is applied to hold the movable parts in place.

The force applied is measured by the force sensor 18 while taking account of the weight of the movable equipment.

A charging or discharging cycle is applied to the cell. The measurements can commence. The movement sensors measure the movement between the bottom compression assembly EI and the top compression assembly ES, or more particularly between the first mounting 11 and the second mounting 11', which is the image of the swelling or deflation of the cell under a given stress.

During the compression phase, the compression parts 12 and 12' expand in the direction X and Y under the effect of the pressure and of the Poisson's ratio of the material that constitutes the compression parts 12 and 12'. Because of the flexibility in the direction X and Y of the contact between the mountings 11 and the compression parts 12, the deformation of the compression parts has no or little effect on the measuring zones, even at the connections by the arms 17, 17', the deformation that they could apply to the mountings 11, 11' is absorbed by the apertures 23, 23'. Thus a parasitic deformation of the measuring zones that would result from the compressive stress at the centre of the compression assemblies due to the Poisson's ratio is avoided. The zones supporting the sensors and the zones where the movement is measured do not undergo any parasitic movement in the direction Z. The precision of the measurement of the movement is then increased.

It can be envisaged modifying the stress applied during the measurement, for example to simulate a more or less rigid battery casing. Thus it is possible to know the behaviour of the cell by reproducing as closely as possible the operating conditions thereof.

The characterisation bench is particularly adapted to studying battery cells, in particular negative electrodes of lithium-ion cells comprising silicon.

It makes it possible to achieve a complete mapping of the behaviour of the electrode according to the state of charge and the pressure applied.

The bench makes it possible to apply a uniform pressure on a surface of a single pair of electrodes on a surface of a sample of battery electrodes, for example a surface of 10 $cm^2$. Thus an electromechanical and mechanical state uniform throughout the cell is obtained, which makes it possible to acquire very precise data that can be used for modelling the electrode material to the electrode scale.

The bench makes it possible to apply pressures ranging up to 10 MPa making it possible to study the entire range of pressures encountered in the cells up to stresses that are damaging for the cell, which also makes it possible to acquire data useful for the safety studies on the behaviour of the cells subjected to accidental stresses.

The bench can make it possible to achieve a precision of +/−50 nm in the direction of the thickness of the electrode, which is the direction of application of the force, and to measure to within 1% the variations in thickness of normal electrodes, the typical variations in thickness being from 5 to 10 µm, for graphite-silicon materials in normal thicknesses.

The motorised characterisation bench of FIG. 1 makes it possible to simulate the behaviour of the electrode in a cell package or pack having arbitrary mechanical characteristics. In this case the force applied is slaved to the thickness measured via a pre-programmed function.

In the examples described, the compression faces are configured for applying a compressive force to the section of nominal thickness of the cell, i.e. its section with the greatest thickness, since it is the part of the cell that it is wished to characterise. It will be understood that the part to be characterised of an object is not necessarily the one with the greatest thickness, it could be a case of the least thickness. The surface area of the compression face or faces is selected to be less than or equal to the part of the object that it is wished to characterise.

This bench can for example be used for characterising crushing under force of porous materials in thin layers, for example implemented in the cells of proton exchange membrane fuel cells (PEMFCs).

The bench makes it possible to measure the mechanical characteristics of the various elements of the cell, in particular the Young's modulus. For this purpose, various force levels are applied to the elements to be tested, for example to the complete cell or to the separate elements of the cell, and the movement caused under the effect of this force is measured. The movement/pressure curve constitutes a behaviour law of the object measured. For certain elements, the measurement is dynamic: for example for the separator of the cell, impregnated with the electrolyte, the movement is not instantaneous. It stabilises after several tens of minutes to several hours after a change in force applied.

The form of the compression parts is adapted to the object that it is wished to characterise. In the example described above, it is wished to characterise a square-shaped battery cell. The compression parts are selected to be square in shape. If the object to be characterised is polygonal in shape other than square or in the form of a disc, the compression parts are selected with a polygonal shape other than square or circular respectively.

The invention claimed is:

1. A bench for mechanically characterizing a thin object by applying a compression force along a given compression axis, comprising:
   a frame;
   a bottom compression assembly resting on the frame and including a first compression face;
   movable equipment that is able to move along the compression axis with respect to the frame and carrying a top compression assembly including a second compression face opposite the first compression face;
   uprights secured to the frame;
   means for applying a force along the compression axis to the object intended to be located between the first and second compression faces, said force having a given intensity and being orthogonal to the first and second compression faces, the means being secured to said uprights;
   at least one force sensor interposed between the movable equipment and the means for applying the force; and
   at least one movement sensor disposed so as to measure movement between the first compression face and the second compression face in a direction of the compression axis, wherein the top compression assembly includes a second compression part carrying the second compression face and a second mounting surrounding the second compression part,
   the second compression part and the second mounting are rigidly connected to each other at least in the direction of the compression axis, and have a connection in directions orthogonal to the movement direction, have low rigidity so that a deformation of the second compression part in a plane orthogonal to a compression direction does not deform or only slightly deforms the second mounting, and
   the at least one movement sensor measures the movement between the top compression assembly and the bottom compression assembly.

2. The characterization bench according to claim 1, wherein
   the bottom compression assembly includes a first compression part carrying the first compression face and a first mounting surrounding the first compression part, and
   the first compression part and the first mounting are rigidly connected to each other at least in the direction of the compression axis, and have a connection in the directions orthogonal to a movement direction that has low rigidity, so that a deformation of the first compression part in the plane orthogonal to the compression direction does not deform or only slightly deforms the first mounting.

3. The characterization bench according to claim 2, wherein
   the first compression part is connected to the first mounting by at least two first arms extending from the first compression part,
   a free end of each first arm is secured to an edge of the first mounting, and
   an aperture in the first mounting passing through a thickness of the first mounting orthogonally to the first arms is located opposite each free end of each first arm.

4. The characterization bench according to claim 3, wherein the at least one movement sensor is carried by the first or second mounting and is in contact with the second or first mounting to measure movement between the first mounting and the second mounting.

5. The characterization bench according to claim 3, wherein
   the second compression part is connected to the second mounting by at least two second arms extending from the second compression part,
   a free end of each second arm is secured to an edge of the second mounting, and
   an aperture in the second mounting passing through a thickness of the second mounting orthogonally to the first arms is located opposite each free end of each first arm.

6. The characterization bench according to claim 1, wherein at least one of the first and second compression faces includes a projecting compression zone a surface area of which is less than or equal to a part of interest of the object to be characterized.

7. The characterization bench according to claim 6, wherein the surface area of the compression zone is equal to a surface area of the part of interest of the object.

8. The characterization bench according to claim 1, including three movement sensors distributed around the compression axis and means configured for comparing measurements of the sensors and detecting a flatness defect.

9. The characterization bench according to claim 1, wherein the second compression part includes a foot downstream of the second compression face in a direction of application of the compression force, said foot including two secant bores located in a plane orthogonal to the direction of application of the compression force.

10. The characterization bench according to claim 1, wherein the compression force is transmitted from the means for applying a force to the first and second compression faces by at least one connection of a point contact type.

11. The characterization bench according to claim 10, wherein the at least one force sensor is connected to the means for applying a force by a connection of the point contact type.

12. The characterization bench according to claim 1, wherein the means for applying a force includes means for modifying the intensity of the force applied.

13. The characterization bench according to claim 1, wherein
the means for applying a force includes a stepping geared motor, at least one first pulley in direct engagement with an output shaft of the geared motor, a second pulley, a cable between the first and second pulleys, at least one first lever carrying the second pulley, and a second lever articulated on the first lever, and
a compression rod is provided between the second lever and the second compression face.

14. The characterization bench according to claim 13, wherein the at least one force sensor is disposed between the second lever and the compression rod.

15. The characterization bench according to claim 13, wherein a transmission of the force between the means for applying the force and the second compression face takes place through two connections of a point contact type.

16. The characterization bench according to claim 15, wherein the compression rod is in point contact with the second lever and the at least one force sensor.

17. A method for characterizing a thin object using a characterization bench according claim 1, comprising:
placing the object on the first compression face so as to align a part of interest with a compression zone,
applying the second compression face to the object, and
measuring the movement between the two compression faces according to an applied compression force.

18. The method according to claim 17, comprising applying a stimulus so as to cause a modification of a volume of the object during the measurement.

19. The method according to claim 17, wherein the thin object is an electrochemical battery cell the part of interest of which is a part including a stack formed by a positive electrode, a separator, a negative electrode, and a package around the stack, the method including, during the measuring, applying at least one of an electrical charging and discharging cycle.

* * * * *